United States Patent
Park et al.

(10) Patent No.: US 10,246,059 B2
(45) Date of Patent: Apr. 2, 2019

(54) WASHER-INTEGRATED TYPE WIPER APPARATUS

(71) Applicants: Hyundai Motor Company, Seoul (KR); Kia Motors Corporation, Seoul (KR); KB Wiper Systems Co., Ltd., Daegu (KR)

(72) Inventors: Jong Min Park, Seoul (KR); Nak Kyoung Kong, Gyeonggi-do (KR); Choong Yeul Kim, Gyeonggi-Do (KR); Ki Hong Lee, Seoul (KR); Keon Soo Jin, Ulsan (KR); Jae Hyuck An, Daegu (KR); Jin Wan Park, Daegu (KR); Kwan Hee Kim, Daegu (KR); Seung Hun Nam, Daegu (KR)

(73) Assignees: Hyundai Motor Company, Seoul (KR); Kia Motors Corporation, Seoul (KR); KB Wiper Systems Co., Ltd., Daegu (KR)

( * ) Notice: Subject to any disclaimer, the term of this patent is extended or adjusted under 35 U.S.C. 154(b) by 198 days.

(21) Appl. No.: 15/207,891

(22) Filed: Jul. 12, 2016

(65) Prior Publication Data

US 2017/0166171 A1    Jun. 15, 2017

(30) Foreign Application Priority Data

Dec. 11, 2015 (KR) ........................ 10-2015-0176713

(51) Int. Cl.
| | |
|---|---|
| *B60S 1/52* | (2006.01) |
| *B60S 1/40* | (2006.01) |
| *B60S 1/48* | (2006.01) |

(52) U.S. Cl.
CPC ................. *B60S 1/522* (2013.01); *B60S 1/40* (2013.01); *B60S 1/487* (2013.01); *B60S 1/488* (2013.01)

(58) Field of Classification Search
USPC ........................................ 15/250.04
See application file for complete search history.

(56) References Cited

U.S. PATENT DOCUMENTS

| | | | |
|---|---|---|---|
| 6,442,788 B1 * | 9/2002 | Fleischer | B60S 1/522 15/250.04 |
| 6,513,185 B1 * | 2/2003 | Zimmer | B60S 1/488 15/250.01 |
| 2013/0139342 A1 * | 6/2013 | Egner-Walter | B60S 1/524 15/250.04 |

FOREIGN PATENT DOCUMENTS

| | | |
|---|---|---|
| KR | 10-1998-0022785 U | 7/1998 |
| KR | 20-1998-068350 | 12/1998 |
| KR | 10-2001-0042476 A | 5/2001 |

(Continued)

*Primary Examiner* — Andrew A Horton
(74) *Attorney, Agent, or Firm* — Mintz Levin Cohn Ferris Glovsky and Popeo, P.C.; Peter F. Corless (57) ABSTRACT

A washer-integrated type wiper apparatus is provided. The washer-integrated type wiper apparatus includes a nozzle cover that is coupled to one side of a bending component of a retainer to support a wiper blade and a hose module that extends in the longitudinal direction in the interior of the retainer and is positioned in the interior of the nozzle cover and is connected to a washer liquid storing tank. Further, a main nozzle is connected in the interior of the nozzle cover to the hose module and is formed to expose a plurality of spray ports to the outside of the nozzle cover and is configured to spray the washer liquid supplied from the washer liquid storing tank through the spray ports. A heater module is installed in the heating area.

7 Claims, 7 Drawing Sheets

(56) References Cited

FOREIGN PATENT DOCUMENTS

| KR | 10-2002-0030312 |   | 4/2002 |
|----|-----------------|---|--------|
| KR | 10-2003-0031891 | A | 4/2003 |
| KR | 10-2008-0112812 | A | 12/2008 |
| KR | 10-2009-0052417 |   | 5/2009 |
| KR | 10-1262945      |   | 5/2013 |

* cited by examiner

WASHER-INTEGRATED TYPE WIPER APPARATUS

CROSS-REFERENCE TO RELATED APPLICATION

This application claims under 35 U.S.C. § 119(a) the benefit of priority to Korean Patent Application No. 10-2015-0176713 filed on Dec. 11, 2015, the entire contents of which are incorporated herein by reference.

BACKGROUND (a) Technical Field

The present disclosure relates to a washer-integrated type wiper apparatus and more particularly, to a washer-integrated type wiper apparatus in which a washer liquid sprayed on a windshield glass is more accurately sprayed within an operation zone of a wiper blade.

(b) Background Art

Typically, a wiper is installed at a lower side of a windshield to provide a unobstructed visual field to a vehicle driver. The wiper is configured to remove water or impurities on the windshield glass as it reciprocates, and provides an unobstructed (e.g., a clean or clear) visual field to a vehicle driver. For example, during operation a washer liquid sprayer is installed at a cowl top cover and a hood of a vehicle. The washer liquid sprayer supplies a washer liquid stored in a washer liquid storing tank disposed within the hood to a pump, to spray the washer liquid through a nozzle onto a windshield glass.

The above conventional washer liquid sprayer includes several functional limitations. For example, when a washer liquid is sprayed to wash and remove contamination water (e.g., water that contains particulate) or other impurities on the windshield glass of a vehicle, the loss of a washer liquid may increase since the spraying timing of the washer liquid does not correctly coincide with the operation timing of a wiper arm. Moreover, since the washer liquid sprayer is fixedly installed at a cowl top cover and a hood of a vehicle, a portion onto which a washer liquid is sprayed may differ from an operation zone of a wiper arm. Accordingly, an inefficient washing operation occurs.

Furthermore, when a washer liquid is sprayed from a washer liquid sprayer to wash and remove contaminated water or other impurities on a windshield glass while a vehicle being driven, the washer liquid may be sprayed even up to a vehicle roof by the vehicle airflow. In other words, the washer liquid fails to reach an appropriate zone of the windshield glass where various impurities are present.

The above information disclosed in this section is intended merely to aid in the understanding of the background of the invention and therefore it may contain information that does not form the prior art that is already known in this country to a person of ordinary skill in the art.

SUMMARY

The present invention provides a washer-integrated type wiper apparatus configured to more accurately spray a washer liquid on a windshield glass, within an operation zone of a wiper blade having a washer spray nozzle disposed at a bending component of a retainer of a wiper arm.

A washer-integrated type wiper apparatus is provided and may include a nozzle cover engaged to one side of a bending component of a retainer provided to support a wiper blade, a hose module which extends in the longitudinal direction on the interior of the retainer and is positioned on the interior of the nozzle cover and is connected to a washer liquid storing tank, a main nozzle is connected in the interior of the nozzle cover to the hose module and is formed to expose a plurality of spray ports to the exterior of the nozzle cover and may be configured to supply washer liquid from the washer liquid storing tank via the spray ports. Further, a heater module may be installed in the heating area defined at the main nozzle and may be configured to transfer heat toward the spray ports.

In particular, the main nozzle may include a spray component disposed to expose the exterior of the nozzle cover. The spray ports may be disposed on the exposed lower surface thereof, and the heating area may be defined on the upper surface thereof. A heater module installation component may be provided to guide an installation passage of the heater module installed in the heating area and may be formed to be bent in the same direction as the bent direction of the nozzle cover. A washer liquid supply component may be disposed to be spaced apart from the heater module installation component and may be integrally connected with the hose module. The washer liquid may be supplied toward the spray ports. The main nozzle may further include a check valve installed at the washer liquid supply unit installed downwardly slanted with respect to the spray ports and may be configured to selectively interrupt the supply of the washer liquid which flows toward the spray ports.

Moreover, the heater module may be installed at the heater module installation component and may include a water tight cover (e.g., sealed) to provide a water tight moving passage for the washer liquid. For example, the water tight cover may include a plurality of terminal guide grooves on an exterior circumferential surface of the water tight cover to fix a position of a terminal and obtain a water tight terminal to couple the positive and negative terminals to the heater module.

Moreover, the main nozzle may include a protrusion member that corresponds to the engaging groove formed at the nozzle cover and the protrusion member may be configured to be inserted into the engaging groove, so the position thereof may be fixed in the interior of the nozzle cover. Further, the nozzle cover may be configured with the interior of the nozzle cover may be filled with a resin to cover the hose module and the main nozzle. Furthermore, the nozzle cover may be form the same surface as the exterior circumferential surface of the bending component of the retainer.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
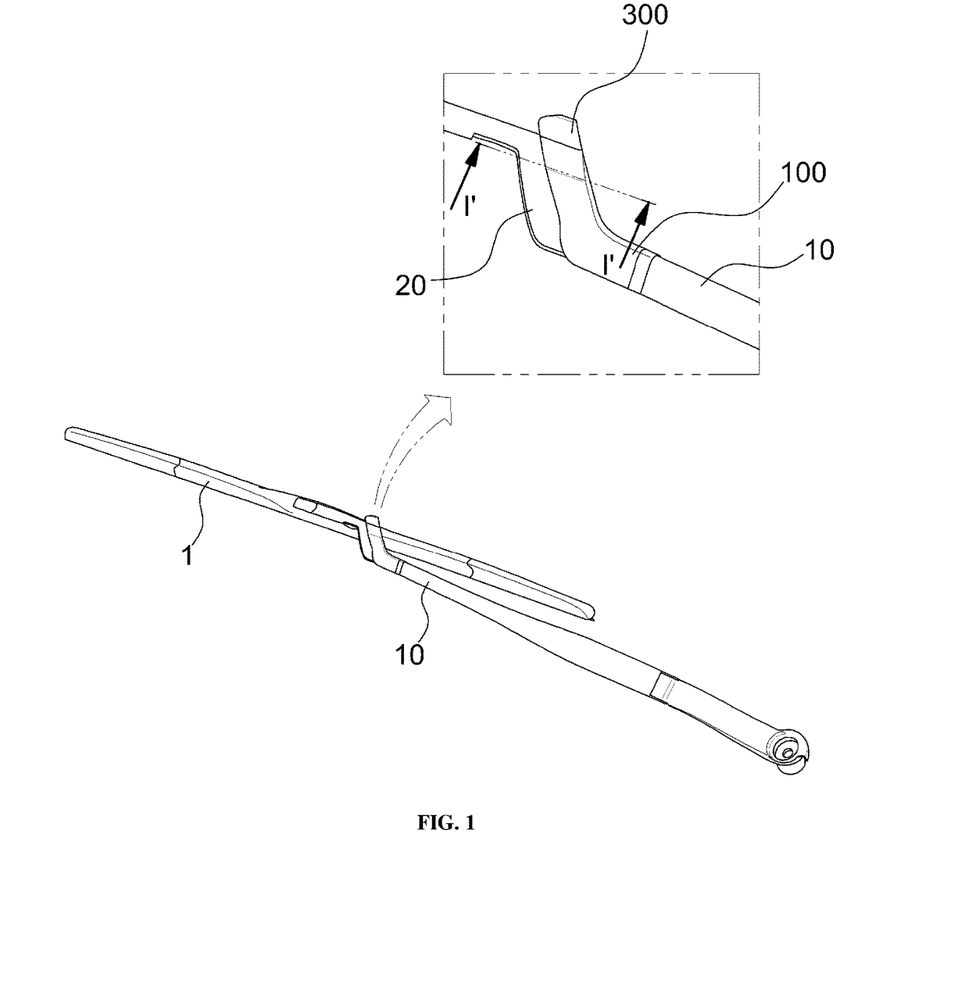
FIG. 1 is an exemplary view schematically illustrating a washer-integrated type wiper apparatus according to an exemplary embodiment of the present invention.
Figure 2:
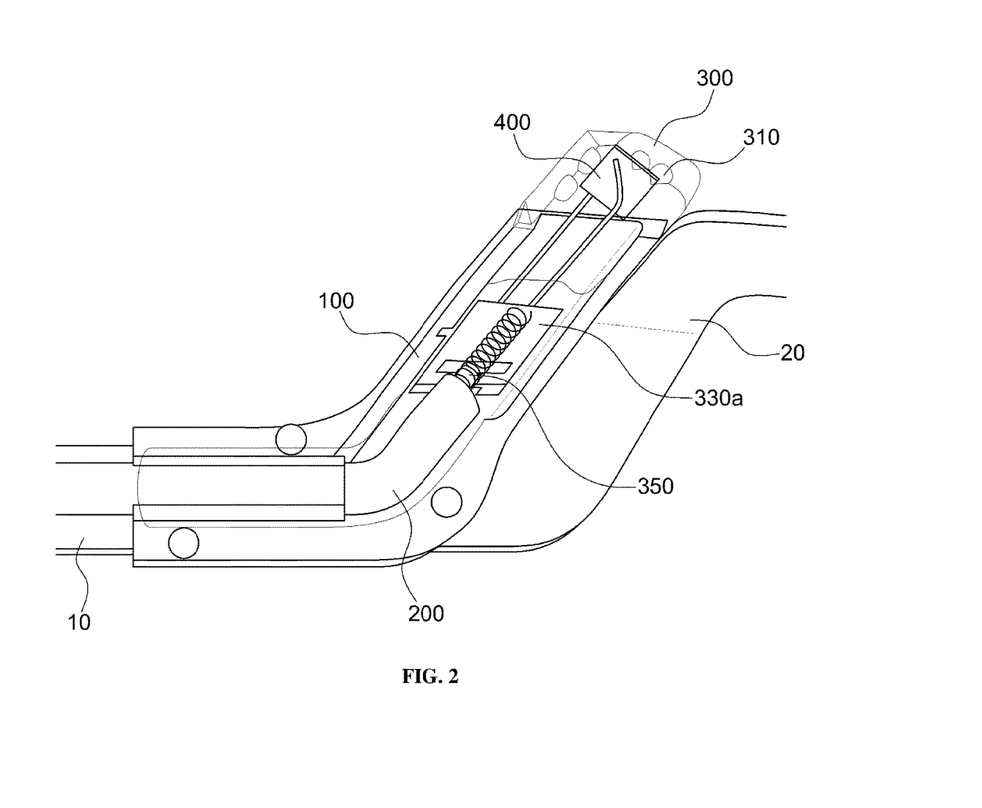
FIG. 2 is an exemplary view illustrating a configuration of a washer-integrated type wiper apparatus according to an exemplary embodiment of the present invention.

FIG. 1 is an exemplary view schematically illustrating a washer-integrated type wiper apparatus according to an exemplary embodiment of the present invention. FIG. 2 is an exemplary view illustrating a configuration of a washer-integrated type wiper apparatus according to an exemplary embodiment of the present invention. As illustrated in FIG. 1, the washer-integrated type wiper apparatus according to the present invention may include a nozzle cover 100, a hose module 200, a main nozzle 300, and a heater module 400. The nozzle cover 100 may be coupled to one side of a bending component 20 of a retainer 10 that may be configured to support a wiper blade 1 provided to remove debris (e.g., impurities) upon movement on a windshield glass of a vehicle.

In particular, the retainer 10 which forms the blade arm may include an end portion coupled the wiper blade 1 and may be bent in a Z-shape in the longitudinal direction. The bending component 20 of the retainer 10 may be formed at a 90° angle (e.g., in a ¬-shape) at a predetermined slope at an end portion of the retainer 10 to be coupled to the wiper blade 1. The nozzle cover 100 may be coupled in the same shape as the shape of the bending component 20, at one side of the bending component 20 of the retainer 10. As illustrated in FIG. 1, an end portion of the nozzle cover 100 may cover an exterior circumferential surface of the retainer 10.

The nozzle cover 100 may be coupled to the same surface as the exterior circumferential surface of the bending component 20 of the retainer 10 to form an integrated shape with respect to the bending component 20 of the retainer 10. Accordingly the wind noise may be reduced due to the stepped portions that have been removed and may thereby enhance a product commercialization of the exterior of the wiper. A synthetic resin, for example, a plastic material, etc. may fill the cavity within the interior of the nozzle cover 100 except the structure in which the hose module 200 and the main nozzle 300 are connected. For example, this configuration maintains the shapes of the hose module 200 and the main nozzle 300 and seals an electric component of the heater module 400.

As illustrated in FIG. 2, the hose module 200 extends in the interior of the retainer 10 in the longitudinal direction. A first end of the hose module 200 may be disposed within of the nozzle cover 100, and a second end of the hose module 200 (not illustrated) may be connected to a washer liquid storing tank. The hose module 200 may be connected in the interior of the nozzle cover 100 to the main nozzle 300, whereupon the washer liquid stored in the washer liquid storing tank may have a predetermined pressure with the aid of the pump (not illustrated), (e.g., may be discharged at a predefined pressure) and the washer liquid may be supplied to the main nozzle 300. In other words, the washer liquid may be sprayed through the spray port 310 disposed at the main nozzle 300 onto the windshield glass of the vehicle.

The main nozzle 300 may be connected in the interior of the nozzle cover 100 to the hose module 200. A plurality of spray ports 310 may be exposed to the exterior of the nozzle cover 100 and may be configured to spray the washer liquid onto the windshield glass of the vehicle. More specifically, the main nozzle 300 may be formed to be bent at the same 90° shape (e.g., in the same ¬-shape) as the shape of the nozzle cover 100 and may be configured to spray the washer liquid supplied from the washer liquid storing tank onto the windshield glass of the vehicle through the externally exposed spray port 310. Additionally, a check valve 350 may be installed in the interior of the main nozzle 300 to prevent a reverse direction flow of the washer liquid which is in the spray port 310. Namely prevention of the reverse direction flow enables selective interruption of the supply of the washer liquid which flows toward the spray port 310.

The heater module 400 may be configured to transfer heat in upward and downward directions toward the spray port 310. Accordingly, freezing of the washer liquid that flows through the main nozzle 300 to the spray port 310 may be prevented during inclement weather (e.g., a winter season). The above heater module 400 may include a water tight cover 330a of a predetermined size and may prevent the input of fluid, (e.g., washer liquid, rain water,) from seeping into the positive and negative terminals connected to the heater module 400.

Figure 3:
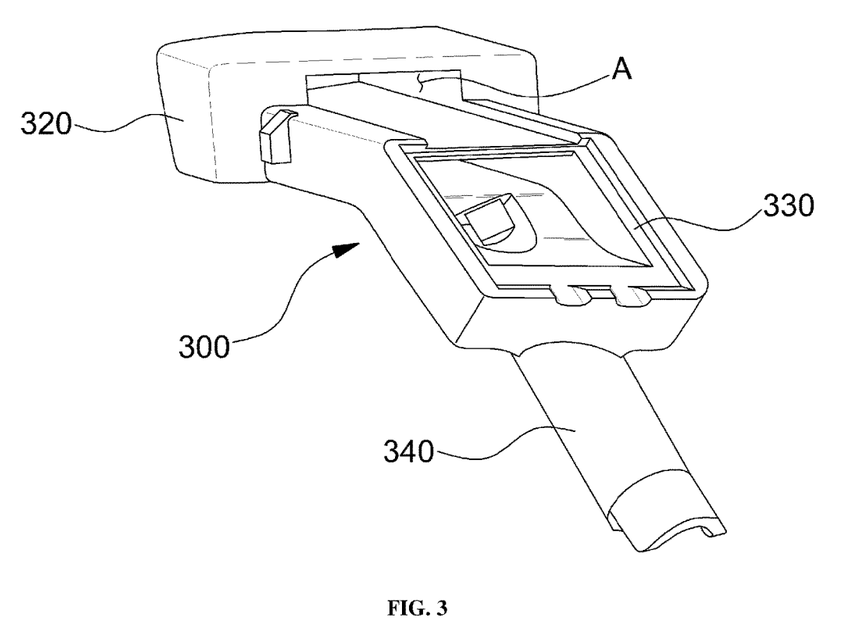
FIG. 3 is an exemplary view illustrating a main nozzle of a washer-integrated type wiper apparatus according to an exemplary embodiment of the present invention.
Figure 4:
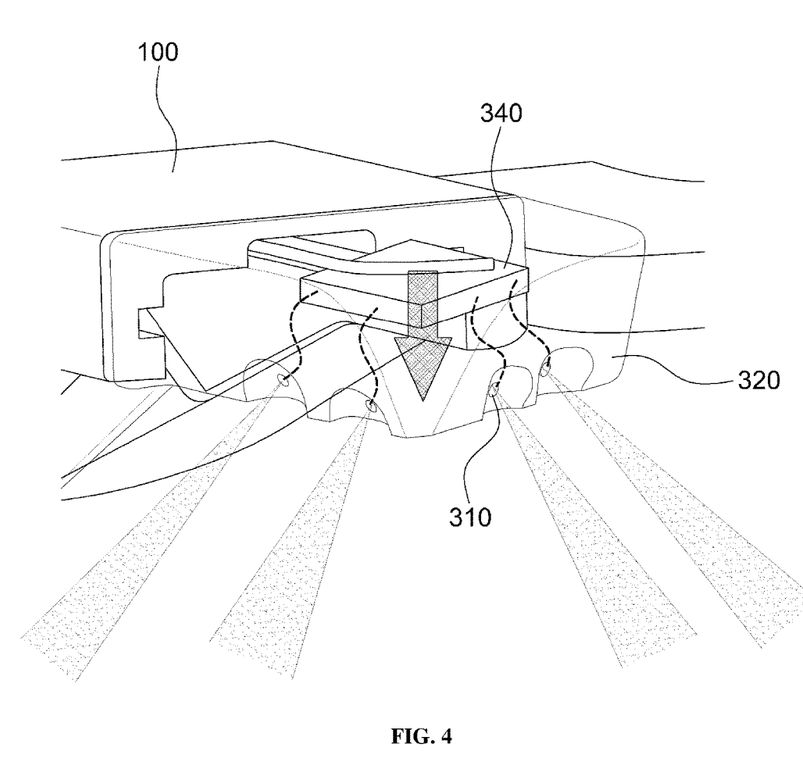
FIG. 4 is an exemplary view illustrating a heater module of a washer-integrated type wiper apparatus according to an exemplary embodiment of the present invention.
Figure 5:
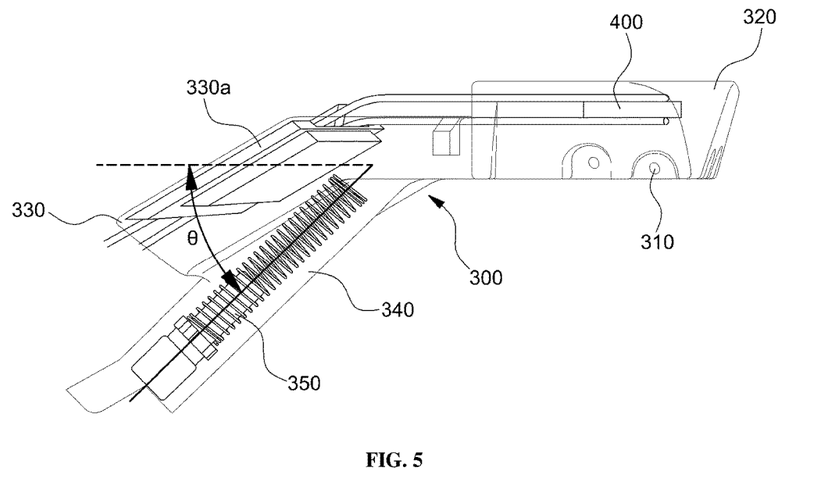
FIG. 5 is an exemplary view illustrating a check valve of a washer-integrated type wiper apparatus according to an exemplary embodiment of the present invention.
Figure 6:
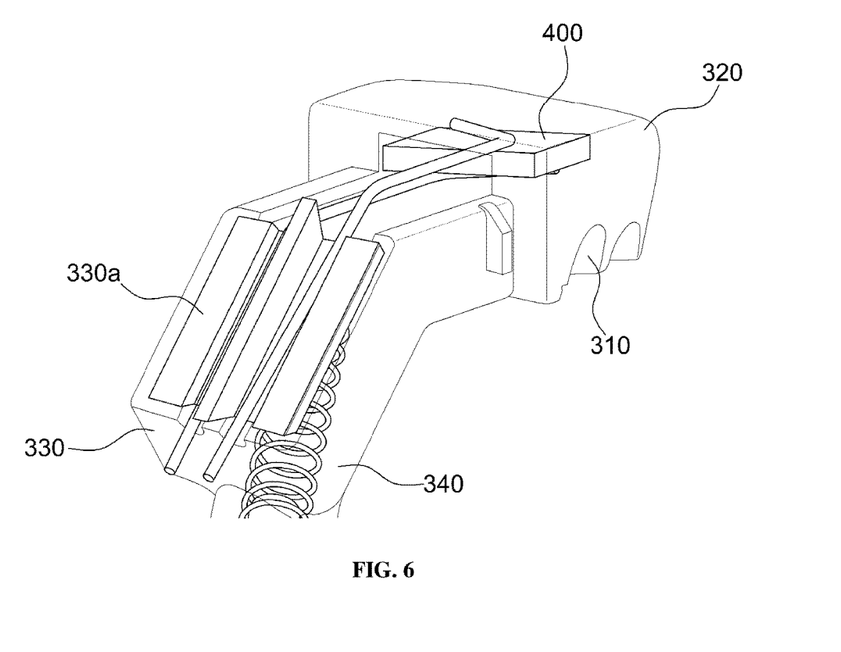
FIG. 6 is an exemplary view illustrating a water tight cover of a washer-integrated type wiper apparatus according to an exemplary embodiment of the present invention.

FIG. 3 is an exemplary view illustrating a main nozzle of a washer-integrated type wiper apparatus according to an exemplary embodiment of the present invention. FIG. 4 is an exemplary view illustrating a heater module of a washer-integrated type wiper apparatus according to an exemplary embodiment of the present invention. Moreover, FIG. 5 is an exemplary view illustrating a check valve of a washer-integrated type wiper apparatus according to an exemplary embodiment of the present invention. FIG. 6 is an exemplary view illustrating a water tight cover of a washer-integrated type wiper apparatus according to an exemplary embodiment of the present invention.

As illustrated in FIG. 3, the main nozzle 300 may include a spray component 320, a heater module installation component 330, and a washer liquid supply component 340. The spray component 320 may be disposed to expose the spray component 320 to the exterior of the nozzle cover 100, and a plurality of spray ports 310 may be disposed at the exposed lower surface thereof, and a heating area "A" may be defined at the upper surface thereof. As illustrated in FIG. 4, the heating area "A" may be defined on the upper surface of the spray component 320 and may be spaced apart from the spray ports 310. The heater module 400 may be installed in the heating area "A". Accordingly, the heat may be transferred in the vertical directions toward a plurality of the spray ports 310 and may prevent freezing of the washer liquid within the spray ports 310.

As illustrated in FIG. 5, the heater module installation component 330 may be may be configured to guide the installation passage of the heater module 400 installed in the heating area "A" and may be bent in the same direction as the bent direction of the nozzle cover 100 with respect to the installation direction of the spray component 320. The above heater module installation component 330 may include a terminal guide groove (not illustrated), and the positive and negative terminals connected to the heater module 400 may be inserted into the terminal guide groove (not illustrated). Therefore, the water tight efficiency of the heater module 400 may be improved with the aid of the water tight cover 330a in FIG. 6.

Moreover, as illustrated in FIG. 5, the washer liquid supply component 340 may be disposed below the heater module installation component 330. In particular, an end portion of the washer liquid supply component 340 may be integrally connected with the hose module 200, and may be configured to supply the washer liquid toward (e.g., in the direction of) the spray ports 310. A check valve 350 may be installed in the interior of the washer supply component 340 and may be configured to prevent reverse direction flow of the washer liquid. For example, the check valve 350 may be configured to selectively interrupt the supply of the washer liquid that flows toward the spray ports 310.

In other words, the check valve 350 may be disposed at a predetermined slanted angle (θ) with respect to the horizontal positions of the spray ports 310 based on the shape of the washer liquid supply component 340. Thus washer liquid may be prevented from passing through the interior that has an inconsistent application of the washer liquid due to the movements of the wiper blade 1. More specifically, when the check valve 350 is disposed on the same line as the spray ports 310 based on the position of the washer liquid supply component 340, the washer liquid left unused after the washer liquid has been sprayed may remain in the spray component 320. This remaining washer liquid may be discharged along the spray ports 310 during the operation of the wiper blade 1 and may provide an inconsistent application of the washer liquid (e.g., sprayed in a random pattern).

Consequently, the check valve 350 according to the present exemplary embodiment may be disposed at a predetermined slanted angle (θ) based on the shape of the washer liquid supply component 340. Accordingly, the washer liquid may move based on the slope (θ) and may be discharged through the spray ports 310. Therefore the washer liquid may be sprayed toward the windshield glass of the vehicle. Moreover, the check valve 350 according to the present exemplary embodiment may allow the washer liquid left unused after the spray to move in the gravity direction and to remain within the washer liquid supply component 340 disposed with a predetermined slope. Accordingly the washer liquid may be prevented from being sprayed randomly when the wiper blade 1 operates.

Figure 7:
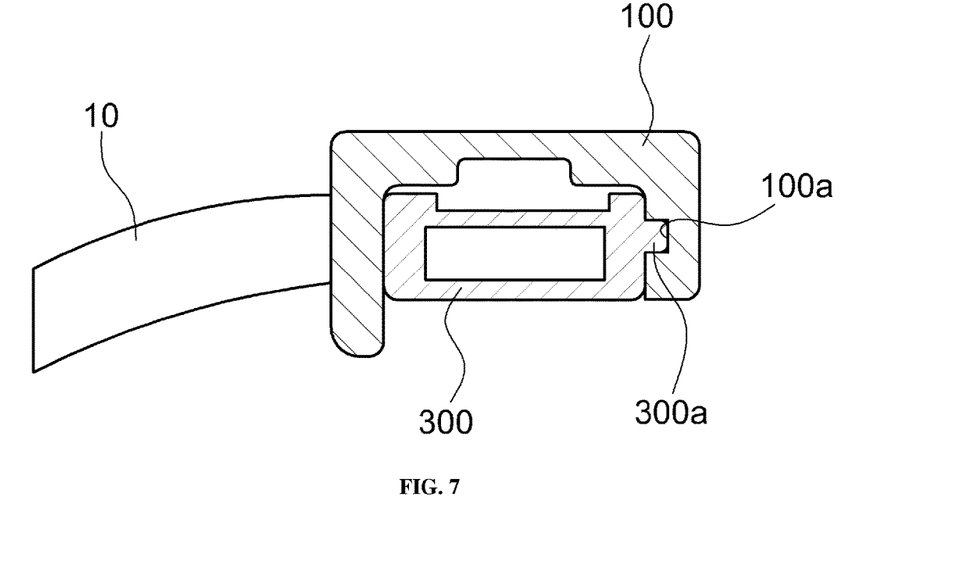
FIG. 7 is an exemplary cross sectional view taken along line I-I' in FIG. 1 to show a position fixing of a main nozzle of a washer-integrated type wiper apparatus according to an exemplary embodiment of the present invention.

FIG. 7 is an exemplary cross sectional view taken along line I-I' in FIG. 1 to show a fixed position of a main nozzle of a washer-integrated type wiper apparatus according to an exemplary embodiment of the present invention. As illustrated in FIG. 7, the main nozzle 300 may include a protrusion member 300a formed to correspond to the engaging groove 100a disposed within the interior of the nozzle cover 100. This protrusion member 300a may be inserted in the engaging groove 100a, and may be fixed to prevent movement within the interior of the nozzle cover 100.

In the exemplary embodiment of the present invention, the main nozzle 300 may be fixed within the interior of the nozzle cover 100 with the aid of an engagement between one engaging groove 100a and one protrusion member 300a. Alternatively, a plurality of the protrusion members 300a may be engaged to a plurality of the corresponding engaging grooves 100a. Consequently, the nozzle cover 100 may be coupled to the main nozzle 300 according to the exemplary embodiment of the present invention. Accordingly, the position may be fixed via an engagement between the engaging groove 100a and the protrusion member 300a in the interior of the nozzle cover 100, rather than by insertion of an additional engaging member (not illustrated) into an exterior side of the nozzle cover 100. In other words, the exposure of the engagement area to the exterior may be minimized and the position of the main nozzle 300 may be fixed more effectively.

In the present invention, when the washer spray nozzle is installed at the retainer bending component of the wiper arm, the washer liquid sprayed on the windshield may be more accurately sprayed within the operation zone of the wiper blade. Moreover, when the heater module is installed at a portion proximate to the spray ports configured to spray the washer liquid, freezing of the washer liquid that flows through the main nozzle to the spray ports may be prevented during inclement weather Furthermore, the stepped portions may be removed in the present invention since the nozzle cover may be installed at one side of the retainer bending component, and accordingly a product commercialization may be enhanced, and a wind noise may be reduced.

The present invention has an effect on spraying a washer liquid, which is sprayed onto a windshield glass, more accurately onto an operation zone of a wiper blade to install a washer spray nozzle at a retainer bending component of a wiper arm. Moreover, the washer-integrated type wiper apparatus according to the present invention is able to prevent any freezing of a washer liquid which flows to a spray port via a main nozzle during a cold winter season to install a heater module near the spray port through which the washer liquid is sprayed. Furthermore, the washer-integrated type wiper apparatus is able to minimize any wind noise while enhancing the marketability of the exterior of the wiper to provide a structure from which stepped portions are removed when a nozzle cover is installed at one side of a bending component of a retainer.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A washer-integrated type wiper apparatus, comprising:
   a nozzle cover coupled to one side of a bending component of a retainer to support a wiper blade;
   a hose module that extends in a longitudinal direction within the retainer and is positioned within the nozzle cover and is coupled to a washer liquid storing tank;
   a main nozzle connected in the interior of the nozzle cover to the hose module and formed to expose a plurality of spray ports to the exterior of the nozzle cover and is configured to spray the washer liquid supplied from the washer liquid storing tank through the spray ports; and
   a heater module which is installed in a heating area defined at the main nozzle and configured to transfer heat in the direction of the spray ports,
   wherein the main nozzle includes:
   a spray component disposed to be exposed to the exterior of the nozzle cover, wherein the spray ports are disposed on the exposed lower surface thereof, and the heating area is defined on the upper surface thereof;
   a heater module installation component configured to guide an installation passage of the heater module installed in the heating area and formed to be bent in the same direction as a bent direction of the nozzle cover; and
   a washer liquid supply component spaced apart from the heater module installation component and integrally connected with the hose module, and configured to supply the washer liquid in the direction of the spray ports.

2. The apparatus of claim 1, wherein the main nozzle includes a check valve installed at the washer liquid supply component installed downwardly slanted with respect to the spray ports, and configured to selectively interrupt a supply of the washer liquid which flows in the direction of the spray ports.

3. The apparatus of claim 1, wherein the heater module is installed at the heater module installation component and includes a water tight cover to provide a water tight passage for the washer liquid.

4. The apparatus of claim 3, wherein the water tight cover includes a plurality of terminal guide grooves on an exterior circumferential surface of the water tight cover to fix a position of a terminal and obtain a water tight terminal to provide a positive terminal and a negative terminal coupled to the heater module.

5. The apparatus of claim 1, wherein the main nozzle includes a protrusion member that corresponds to an engaging groove formed at the nozzle cover, and the protrusion member is engaged to be inserted into the engaging groove, to fix the position in the interior of the nozzle cover.

6. The apparatus of claim 1, wherein an interior of the nozzle cover is configured to be filled with a resin.

7. The apparatus of claim 1, wherein the nozzle cover is configured to form a same surface as an exterior circumferential surface of the bending component of the retainer.

* * * * *